Patented Nov. 20, 1934

1,981,292

UNITED STATES PATENT OFFICE 1,981,292

EMULSIFYING AGENT

William Todd and Anthony James Hailwood, Blackley, Manchester, England, assignors to Imperial Chemical Industries Limited, a corporation of Great Britain No Drawing. Application November 14, 1932, Serial No. 642,682. In Great Britain November 25, 1931

15 Claims. (Cl. 252—1)

This invention relates to chemical compositions, especially useful as emulsifying and dispersing agents, and a process for the production thereof. It further relates to stable emulsions, dispersions and the like, and a method of producing them.

It is known that protective colloids such as glue, gelatine, and other substances giving in water gelatinizable solutions have been proposed for use in the production of dispersions and emulsions of various kinds. The use of these substances is attended by the disadvantage, however, that their solutions are viscous and the tendency to gelatinize presents difficulties in their practical application.

It is an object of the invention to produce new and improved chemical compositions useful as emulsifying and dispersing agents. A further object is the production of stable emulsions. Other objects will appear hereinafter.

These objects are accomplished according to this invention whereby chemical compositions of improved emulsifying and dispersing properties are produced by homogeneously bringing together a water solution of a protective colloid and a quaternary ammonium salt containing an alkyl radical, preferably having at least ten carbon atoms. Further, in accordance with the invention, we prepare improved emulsions and/or dispersions from water and water immiscible or only slightly miscible liquids by using the improved emulsifying agents, the ingredients of the emulsion being emulsified together in any known way.

The invention will be illustrated, but is not limited, by the following examples, in which the parts are by weight.

Example I

Twenty parts of bone glue were allowed to swell in 100 parts of water and finally dissolved by gentle warming at 50° C. Five parts of pyridinium octadecyl bromide were dissolved in 50 parts of water. The two solutions were heated to 50° C. and mixed. The resultant product, which was very fluid, was an excellent dispersing and emulsifying agent.

A similar product was obtained when pyridinium dodecyl bromide was used instead of pyridinium octadecyl bromide. Gelatine, starch, or gum arabic may be used instead of glue.

Example II

Fifty parts of bone or skin glue were allowed to swell in 50 parts of water and finally dissolved by warming at 50° C. Five parts of pyridinium octadecyl bromide were dissolved in 50 parts of water. The two solutions were mixed, and the product was quite fluid even in the cold.

A similar product was obtained when pyridinium dodecyl bromide was used in place of pyridinium octadecyl bromide.

Any of the products so obtained may be dried on a water bath or in a vacuum drier; the product so formed readily dissolves in water with unimpaired dispersive or emulsifying properties. The products as they stand are useful as sizing preparations.

Example III

Ten parts of the product produced by combining bone glue, pyridinium octadecyl bromide, and water as described in Example I were added to 20 parts of water. Seventy parts of neutral tar oil were slowly added while stirring rapidly. An emulsion was obtained which was quite stable on dilution.

Example IV

Thirty-three parts of the product prepared by combining bone glue, pyridinium dodecyl bromide, and water as described in Example II were added to 33 parts of water. Thirty-three parts of melted paraffin wax was slowly added, and the whole stirred until cold. An emulsion, stable on dilution, was obtained.

Example V

Thirty parts of the product prepared by combining bone glue, pyridinium dodecyl bromide, and water as described in Example II were added to 20 parts of water. Fifty parts of castor oil were slowly added with stirring. The white emulsion obtained was quite stable on dilution.

Example VI

Twenty parts of the product prepared by combining bone glue, pyridinium dodecyl bromide, and water as described in Example II were added to 30 parts of water. Fifty parts of dichlorobenzene were slowly added. On stirring, a white emulsion was obtained. Mineral oils may be similarly emulsified.

Any protective colloid, such as, for example, glue, gelatine, agar-agar, dimethyl cellulose, isinglass, starch, water-soluble gums such as gum arabic, or similar substances capable of giving a gelatinous or jelly-like water solution, may be combined with a quaternary ammonium salt to produce the new emulsifying agents.

The quaternary ammonium salts preferably employed are water-soluble quaternary ammonium salts in which the ammonium nitrogen is part of a heterocyclic nucleus and contains an alkyl radical having at least 10 carbon atoms. The higher alkyl radical attached to the ammonium radical should preferably be a normal or straight chain radical. As specific examples of quaternary ammonium salts which we preferably combine with protective colloids in accordance with the invention may be mentioned pyridinium dodecyl (lauryl) bromide, pyridinium myristyl bromide, pyridinium oleyl bromide, pyridinium cetyl bromide, pyridinium octadecyl (stearyl) bromide, alpha picolinium octadecyl bromide, beta picolinium octadecyl bromide, gama picolinium octadecyl bromide, and the corresponding iodides, chlorides, sulfates, acetates, formates or other salts thereof. Instead of pyridinium or substituted pyridinium quaternary ammonium salts, higher alkyl quaternary ammonium salts of quinoline or substituted quinolines may be used.

The method of bringing together the protective colloid and quaternary ammonium compound may vary widely. The method described in the examples has given particularly desirable results. As indicated in Example II, the emulsifying or dispersing solution may be evaporated to dryness. The solid substance which is obtained when dissolved in water gives a solution with the same properties as the original. Hence, the new emulsifying agents may be conveniently shipped in solid form. If desired, they may be added directly to mixtures of water and water immiscible liquids to be emulsified or dispersed. Emulsifying compositions comprising a protective colloid such as glue and a heterocyclic quaternary ammonium compound containing 10 to 20 carbon atoms are especially useful.

The proportions of protective colloid and quaternary ammonium in the compositions produced may vary widely depending largely upon the properties of the specific substances chosen. The proportions best suited for a specific use may be determined by empirical methods. In general, good results have been obtained with compositions containing about one part of quaternary ammonium compound, and about four to about ten parts of protective colloid. The amount of water used to give the composition fluidity may vary widely; for instance, in the products described in the Examples I and II, about 20 to 30 times as much water as quaternary ammonium compound was used.

Emulsions or dispersions prepared in accordance with the invention are characterized in general by excellent stability. The invention is generally applicable to the preparation of emulsions or dispersions of water and water immiscible liquids, or solids capable of dispersion as such or in the liquid state, such as, for example, water immiscible or only partly miscible oils, fats, waxes, alcohols, ketones, esters, hydrocarbons and other dispersible materials insoluble or difficultly soluble in water. In particular, good results have been obtained in the production of emulsions of water and fatty oils, i. e., oils containing fatty acids or glycerides of fatty acids, e. g., olein, stearin, and palmitin, with our new emulsifying agents. These emulsifying agents may also be used in producing colloidal dispersions of inorganic or organic colors in various non-solvents, sulfur in glycerine, and the like.

As many apparently widely different embodiments of this invention may be made without departing from the spirit and scope thereof, it will be understood that we do not limit ourselves to the specific embodiments thereof except as defined in the following claims.

We claim:

1. A chemical composition comprising a protective colloid and a heterocyclic quaternary ammonium salt containing an acyclic carbon chain having at least ten carbon atoms.

2. A chemical composition comprising a protective colloid and pyridinium octadecyl bromide.

3. A chemical composition comprising glue and pyridinium octadecyl bromide.

4. A chemical composition comprising substantially about 20 parts of bone glue and about 5 parts of pyridinium octadecyl bromide.

5. The process of producing emulsions which comprises emulsifying water and a water immiscible liquid with a composition of claim 1.

6. The process of producing emulsions which comprises emulsifying water and a fatty oil with the composition of claim 4.

7. Stable emulsions resulting from emulsifying water and a water immiscible liquid with a composition of claim 1.

8. Stable emulsions resulting from emulsifying water and a fatty oil with the composition of claim 4.

9. A chemical composition comprising a protective colloid and a heterocyclic quaternary ammonium halide having attached directly to a quaternary ammonimum nitrogen atom an alkyl radical containing at least ten carbon atoms.

10. A chemical composition comprising a protective colloid and a salt containing an alkyl radical having at least ten carbon atoms attached to a nitrogen atom which is part of a heterocyclic nucleus.

11. A chemical composition comprising glue and a salt in which a nitrogen is part of a heterocyclic nucleus and has attached directly thereto an alkyl radical having ten to eighteen carbon atoms.

12. Stable emulsions resulting from emulsifying water, a water-immiscible liquid, a protective colloid, and a salt containing a nitrogen atom which is part of a heterocyclic nucleus of the pyridine series and has attached thereto an alkyl radical having at least ten carbon atoms.

13. Stable emulsions resulting from emulsifying water and a water-immiscible liquid with a composition of claim 11.

14. A chemical composition comprising a protective colloid and pyridinium dodecyl bromide.

15. A composition comprising glue and pyridinium dodecyl bromide.

WILLIAM TODD.
ANTHONY JAMES HAILWOOD.